United States Patent
Pandey

(10) Patent No.: US 10,514,898 B2
(45) Date of Patent: Dec. 24, 2019

(54) METHOD AND SYSTEM TO DEVELOP, DEPLOY, TEST, AND MANAGE PLATFORM-INDEPENDENT SOFTWARE

(71) Applicant: Raju Pandey, Davis, CA (US)

(72) Inventor: Raju Pandey, Davis, CA (US)

(73) Assignee: Raju Pandey

( * ) Notice: Subject to any disclaimer, the term of this patent is extended or adjusted under 35 U.S.C. 154(b) by 0 days.

(21) Appl. No.: 16/056,522

(22) Filed: Aug. 7, 2018

(65) Prior Publication Data

US 2019/0050209 A1 Feb. 14, 2019

Related U.S. Application Data

(60) Provisional application No. 62/543,957, filed on Aug. 10, 2017.

(51) Int. Cl.
| | |
|---|---|
| *G06F 8/41* | (2018.01) |
| *G06F 8/71* | (2018.01) |
| *G06F 8/30* | (2018.01) |
| *G06F 11/36* | (2006.01) |

(52) U.S. Cl.
CPC ............... *G06F 8/427* (2013.01); *G06F 8/30* (2013.01); *G06F 8/42* (2013.01); *G06F 8/436* (2013.01); *G06F 8/71* (2013.01); *G06F 11/3608* (2013.01); *G06F 8/425* (2013.01)

(58) Field of Classification Search
CPC ... G06F 8/30; G06F 8/42; G06F 8/425; G06F 8/427; G06F 8/436; G06F 8/71; G06F 11/3608
USPC .................................. 717/106–109, 140–161
See application file for complete search history.

(56) References Cited

U.S. PATENT DOCUMENTS

| | | | |
|---|---|---|---|
| 6,952,817 B1* | 10/2005 | Harris | G06F 17/505 716/103 |
| 7,086,047 B1* | 8/2006 | Edwards | G06F 8/443 717/106 |
| 7,111,274 B1* | 9/2006 | Edwards | G06F 17/5045 716/103 |
| 7,164,422 B1* | 1/2007 | Wholey, III | G06F 9/4494 345/440.1 |

\* cited by examiner

*Primary Examiner* — Qing Chen

(57) ABSTRACT

Some embodiments described herein provide a system for creating platform-independent software application programs. During operation, the system receives a configuration program and an application program, the application program including conditional and unconditional components. The system creates a configuration executable binary and loads this binary into a configuration execution space. The system creates a parse tree of the application program. Subsequently, the system evaluates each component of the application program in the configuration execution space and generates a modified parse tree of the application program. Semantic analysis is performed on this modified parse tree to generate an executable binary and a composition map for the application program.

20 Claims, 11 Drawing Sheets

METHOD AND SYSTEM TO DEVELOP, DEPLOY, TEST, AND MANAGE PLATFORM-INDEPENDENT SOFTWARE

RELATED APPLICATION

This application hereby claims priority under 35 U.S.C. § 119 to U.S. Provisional Application No. 62/543,957 entitled "METHODS FOR DEVELOPING, DEPLOYING, TESTING, AND MANAGING PLATFORM-INDEPENDENT SOFTWARE," by inventor Raju Pandey, filed on 10 Aug. 2017.

FIELD

The present invention generally relates to techniques for developing, testing, deploying and managing software across a wide diversity of platforms, contexts, situations, runtime systems, technologies and underlying devices. More specifically, the present invention relates to a method and system for building platform-independent software using a programming language and a set of tools to perform semantic analysis, generate code, test code, distribute binaries, and manage changes in software applications.

BACKGROUND

Developers face significant challenge in developing and managing software applications when dealing with the complexity of wide diversity among platforms, tools, technologies, and underlying devices. This diversity has to be managed during all phases of a software product cycle, including design, development, build, testing, deployment, monitoring and management. Furthermore, mobile devices differ in hardware as well as in the platform support (iOS™ vs. Android™ vs. Windows™). Internet of Things (IoT) devices vary significantly in the amount of resources (i.e., memory, power, CPU, etc.), and often require special low-level development tools. Different platforms have different technologies, configuration, and computational models, and application programming interfaces (APIs). Building an application for a wide spectrum of platforms, devices and technologies often means rewriting a large portion of the application code using different programming languages (C, Java, Objective-C, HTML, JavaScript), tools, libraries, and platform support. This results in high development and management cost, inconsistent and poor product experience across devices, and low software quality. As variability increases, the process of developing, testing, deploying and distributing software across these devices becomes increasing more complex. Further, as changes occur in applications or the underlying software, managing and distributing those changes to different platforms become even harder.

Embodiments described herein present methods for developing, building, deploying, testing, and managing software applications. The methods for building platform-independent software described herein involve adding a set of conditional abstractions as part of programming language constructs for a new programming language, and adding a set of tools that take applications written in this language as input, and that perform syntax and semantic analysis, compose application components, generate binary code, distribute and install code on devices, and manage changes in software applications.

SUMMARY

The disclosed embodiments provide a system for creating an executable binary of an application program. During operation, the system receives a configuration program as well as an application program with conditional and unconditional components. Next, the system creates a configuration executable binary of the configuration program. The system then loads the configuration executable binary into a configuration execution space. The system then creates a parse tree of the application program, and, for each conditional component in the parse tree, evaluates the component in the configuration execution space for inclusion in the application program, and marks the component for inclusion based on the evaluation. The system then modifies the parse tree based on the marked components, performs semantic analysis of the modified parse tree and generates an executable binary and a composition map.

In some embodiments described herein, the one or more conditional components may be a one or more of: a conditional module, a conditional class, a conditional function, a conditional statement, and a conditional variable.

In some embodiments described herein, the one or more conditional components are each associated with a set of one or more component-specific conditions.

In some embodiments described herein, the system evaluates a component for inclusion in the application program by evaluating one or more component-specific conditions of the component in the configuration execution space.

In one embodiment described herein, the system evaluates a component-specific condition of the component in the configuration execution space by determining if the component-specific condition evaluates to true or to false in the configuration execution space.

In another embodiment described herein, the system marks the component for inclusion based on the evaluation by determining, based on the evaluation, that the component should be included in the application, and marking the component for inclusion in the parse tree.

In some embodiments, the system marks the component for inclusion based on the evaluation by determining, based on the evaluation, that the component should not be included in the application, and removing the component from the parse tree.

In another embodiment described herein, the system modifies the parse tree based on the marked components by merging one or more marked components in the parse tree.

In one embodiment described herein, the system merges the one or more marked components in the parse tree based on composition rules.

In other embodiments described herein, the system defines the composition rules specifically for at least each of: a conditional module, a conditional class, a conditional function, a conditional statement, and a conditional variable.

DETAILED DESCRIPTION

Figure 1A:
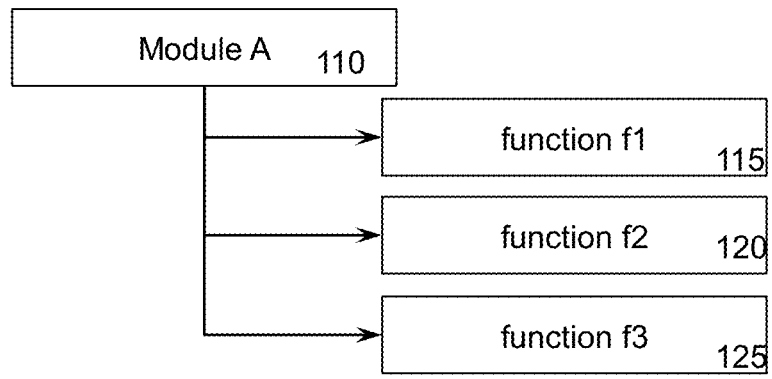
FIG. 1A depicts a representation of a module in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored in a non-transitory computer-readable storage medium as described above. When a computer system reads and executes the code and/or data stored on the computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

General Overview

Software components, applications, and systems need to be adapted so that they can operate in multiple situations. These situations are termed context herein. Examples of context occur in different forms. For instance, a mobile application may need to run on differing mobile platforms such as iOS™ Android™, and Windows™. Adapting an application to different platforms requires both porting the software onto the underlying software infrastructure, and customizing the application behavior to specific capabilities of the platform. Similarly, a function may be executed within different contexts, for development, for testing, or for production. Each execution will exhibit core execution behavior of the function as well as situation-specific behavior. For instance, during testing, the function may not only execute its core functionality, but also perform some additional testing-related functionalities (such as, for example, check for assertions, logging, etc.).

The ability to adapt a software application to different contexts primarily depends on the ability to divide the application into two broad sets of components: components that are common across different contexts, and components that vary across different contexts. For instance, an application running on a device usually contains code (usually fifty to eighty percent) that is common across all instance of the applications, and differentiated (or variable) (about twenty to fifty percent) code that changes depending on the context in which an application is used. The differentiated code may arise because of platform diversity, resource diversity, technology diversity, software intent, or process intent (for instance, development vs. testing vs. product), etc. In order to adapt a software application to multiple contexts, a system is needed that allows software application developers to build software for a set of contexts, and then extend it to other contexts by primarily providing context-specific components. This software methodology is termed "build for one, extend to any" in embodiments described herein.

Embodiments described herein propose a system for building, testing, distributing, and managing software applications that support such a methodology.

Details describing various embodiments follow below:

Representing Variability

Some embodiments described herein involve identifying conditional software components that are specific to a situation, and associating context-specific programmable conditions with the identified conditional software components. A conditional software component is defined as follows: (i) program code that is specific to a context, and (ii) conditions that represent a particular context. The conditions may depend on the platform (for example, iPhone™ vs. Android™), resources (memory size, battery power, etc.), process (testing vs. development), product features, among others.

Programming languages include abstractions to make it easier for developers to write programs. Examples of these abstractions include modules and packages, classes and objects, threads and processes, functions and closures, statement and expressions, etc. A software component is composed from the various abstractions.

Embodiments described herein define programming languages that support the notion of conditional abstractions. In other words, a program not only includes a class abstraction, but may also include a conditional class abstraction. The semantics here is that a conditional abstraction is included in an overall software application only if the associated condition is true. Several conditional abstractions are discussed below. While different languages represent different abstractions, the discussion below highlights what it means to associate conditional abstractions with these abstractions. In embodiments described herein, the scope of conditional abstractions is not limited to just the abstractions enumerated below, but extends over all possible conditional abstractions possible.

Conditional Modules

A module is an abstraction with respect to organizing software components. A module may contain other modules, functions, variables, classes and other abstractions of the language.

In embodiments described herein, a module may be associated with a set of conditions. Consider the following example:

```
module BackendServer
{
    function serve ( ) { ..}
    ...
}
module MultiThreaded( ) &&
    MemoryIsBigEnough( )::BackendServer
{
    function serve ( ) { ..}
    ...
}
module SingleThreaded( )::BackendServer
{
    function serve ( ) { ..}
    ...
}
```

There are three modules: one unconditional module (BackendServer), and two conditional modules (MultiThreaded( ) && MemoryIsBigEnough( )::BackendServer and SingleThreaded( )::BackendServer). (MultiThreaded( ) && MemoryIsBigEnough( ) and SingleThreaded( ) are Boolean expressions (conditions) associated with the modules. Thus, Module BackendServer is defined in terms of an unconditional module and two conditional modules. During the composition, embodiments described herein will evaluate each condition associated with the modules and merge the modules into a single module. By controlling conditions using embodiments described herein, the application developer may therefore include, exclude, or even over-write individual components of a module. This allows creation of different versions of a module each pertaining to different conditions. More importantly, it enables programmability of these selections.

Conditional Classes

A class defines the necessary abstraction required for modeling the state and behavior of a set of entities, called objects. Conceptually, a class plays two roles: the first is the primary role of defining a blueprint for creating objects. The second is class as an abstract entity with its own state and behavior.

Embodiments described herein propose support for programming languages to associate classes with conditions. For instance, as shown below, the abstraction of a Camera is defined by a common class, which captures the common properties of a camera, as well two conditional classes that capture the capabilities of cameras supported by specific platforms:

```
class Camera {
    function start( ) {...}
```

```
    function stop( ) {...}
    function takePicture( ) { ..}
    ...
}
class IOS( )::Camera {
    function processImage( ) { ..}
    ...
}
class Android( )::Camera {
    function takeVideo( ) { ..}
    ...
}
```

There are three classes: one unconditional class (Camera), and two conditional classes IOS( )::Camera and Android( )::Camera). IOS( ) and Android( ) are Boolean expressions (conditions) associated with the classes. Thus, class Camera is defined in terms of an unconditional class and two conditional classes.

During program composition, the system will evaluate conditions associated with each class, and merge the classes into a single class. Thus, by using conditional classes, an application developer may capture platform independent camera operations in one class, and include class-specific operations in platform-specific classes. By controlling the conditions, the application developer may include, exclude or even over-write the individual components (such as static variables, static function, instance variables and instance methods) of a class.

Conditional Functions

A function is a control abstraction for associating a name with a set of statements. Control abstractions are mechanisms for organizing and abstracting complex computations into meaningful units. Embodiments described herein propose support for programming languages to associate functions with conditions. An application developer may associate conditions with functions, each function possibly denoting a variation of the core function.

Consider the example below.

```
module algorithms {
    function algorithmA( ) { ..}
    function largeMemory( )::algorithmA( ) {...}
    function hasGraphicProcessor( )::algorithmA( ){..}
    ...
}
```

There are three functions: one unconditional function (algorithmA), and two conditional functions largeMemory( )::algorithmA and hasGraphicProcessor( )::algorithmA) largeMemory( ) and hasGraphicProcessor( ) are Boolean expressions (conditions) associated with the functions. The module defines three variations of an algorithmA, each selected on the basis of specific conditions. During the composition, the system will evaluate the condition associated with each function and select a unique one. Thus, the developer may choose a specific algorithm on the basis of specific conditions. Using this approach, embodiments described herein allows for variations in algorithm to be captured within the same name scope and then selected at compile time based on specific contexts.

Conditional Variables

A variable stores the state of an application. In programming languages, variables are part of various abstractions such has modules, classes (static and instance), functions, blocks, and others. The nature and value of the state may be different depending on the context of the application. Embodiments described herein propose support for programming languages to associate variables with conditions. A software application developer may associate conditions with module variables, class static variables, as well instance variables, and function and block variables. This allows the developer to create variability at the state level. Consider the following example:

```
module algorithms {
    var largeMemory( )::a:Long;
    var smallMemory( )::a:Short;
}
```

The variable a is defined in terms of two conditional variables: largeMemory( )::a and smallMemory( )::a. The type of variable a depends whether largeMemory( ) is true or smallMemory( ) is true. During the composition, the system will evaluate conditions associated with each variable, and combine the overlapping variables.

Conditional Statements

Statements are units of execution. They provide the basis for structuring computations. Examples of statements include if-then-else, while, for, and case statements. Embodiments described herein propose support for programming languages to associate statements with conditions. This allows application developer to control execution of specific statements by associating conditions. Consider the example below:

```
module algorithms {
    function f( )
    {
        TESTING( ) || DEVELOPING( )::{
            log(data) };
    }
}
```

In this example, the statement log(data) will be executed only if either of the two Boolean expressions TESTING( ) and DEVELOPING( ) are true. This statement can be easily removed from execution by setting the two conditions to false. This allows a developer to create variability in their code base within a common name space and control that variability in a programmable way.

Other Conditional Abstractions

Programming languages may define other abstractions as a part of the language. These may include threading, tasking, task queues, messaging, RPC, distributed programming, etc. The idea of control abstraction extends to these abstractions in a similar way. Embodiments described herein provide support for these and other programming languages computational abstractions as well.

Composition Rules

Embodiments described herein involve compiling both conditional and unconditional components to create a final program. The compiling involves the composition of conditional and unconditional components. For instance, consider that a program defines an unconditional component A and a conditional component C::A. Assume that condition A is true. The composition rules describe how the nested components of A and C::A will be merged together by the system.

Composition Rules for Modules:

A module M and a conditional module cond( )::M are merged if cond( ) is true. During the merge process, each component C of modules M and cond( )::M is analyzed and merged in the following manner: (i)

If C is a variable:
For variable C and conditional variable e( )::C, if condition e( )::C is true, the e( )::C replaces the unconditional definition.
For a variable e( )::C if e( ) is true and C is not defined, include C as a part of the definition of the module.

If C is a function:
For a function C( . . . ) and conditional function e( )::C( . . . ), if e( ) is true, e( )::C( ) replaces C. For languages that allow method overloading, the types of both function C( . . . ) and e::C( . . . ) must match.
For a function e( )::C( . . . ) if e( ) is true and C is not defined in the module, e( )::C( . . . ) to the module.
For a function C, which is used to initialize a module, merge conditional and unconditional components. Such functions are invoked when a module or a package is loaded, and used to initialize the state of the module.
For a function C, which is used to finalize a module, merge conditional and unconditional components. Such functions are invoked when a module or a package is unloaded, and used to release any resources associated with the module.

If C is a class, see the rules below for composing conditional and unconditional classes.

If C is a module and conditional module e( )::C( . . . ) and if e( ) is true, use the rules for merging components for merging C and e( ):C( . . . ).

Composition Rules for Classes:

A class contains static variables, static methods, derived variables, derived methods, instance variables, and instance methods as components. A class M and a conditional class cond( )::M are merged if cond( ) is true. During the merge process, each component C of class M and conditional class cond( )::M is analyzed and merged in the following manner:

If C is a static variable, instance variable or derived variable:
For variable C and conditional variable e( )::C, if condition e( ) is true, the e( )::C replaces the unconditional definition.
For a variable e( )::C, if e( ) is true and C is not defined, include C as a part of the definition of the module.

If C is a static function, instance function or derived function:
For a function C( . . . ) and conditional function e( )::C( . . . ) that match with parameter types, if e( ) is true, e( )::C( . . . ) replaces C.
For a function e( )::C( . . . ), if e( ) is true and C is not defined in the module, add e( )::C( . . . ) to the module.

If C is a constructor function or a finalizer function, merge conditional and unconditional components.

If C is a class initializer function or a class finalizer function, merge conditional and unconditional components. A class initializer function is called whenever a class is loaded, and the function is primarily used for initializing the class's state or allocate resources of the class. A class finalizer function is called when the class is unloaded, and used to release any resources associated with class.

Composition Rules for Blocks or Statements:

Assume that a function f and/or a block includes a conditional statement or a conditional block statement e( )::S. If the Boolean expression e( ) is true, function or the block will include S as a statement in the body of the function or the block. If e( ) is not true, the statement S is removed from the body of the function or the block. By controlling the condition, the software developer can programmatically control aspects of code.

Examples are depicted to show how the composition framework will apply on specific abstractions. FIG. 1A shows a module A 110, with three functions, f1 115, f2 120, and f3 125.

Figure 1B:
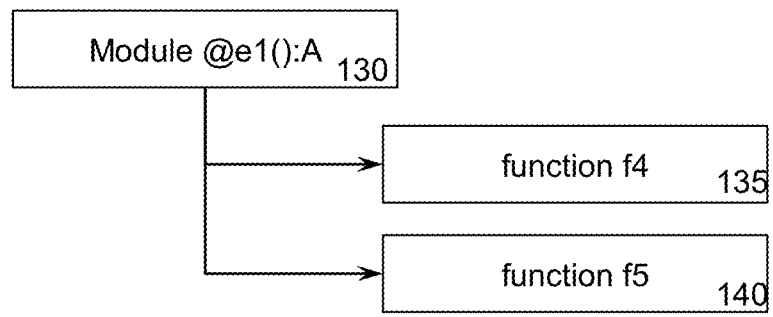
FIG. 1B depicts another representation of a module in accordance with an embodiment of the present invention

FIG. 1B depicts a module e1( )::A 130 with additional functions f4 135 and f5 140. If condition e1( ) is true, the composition of A and e1( )::A will include functions f1, f2, f3, f4 and f5. Enabling addition of these functions in embodiments depicted herein enables capture of additional capabilities that are only available in a new context as defined by conditional expression e1( ). In addition, the capabilities of a module can be modified to match the context.

Figure 1C:
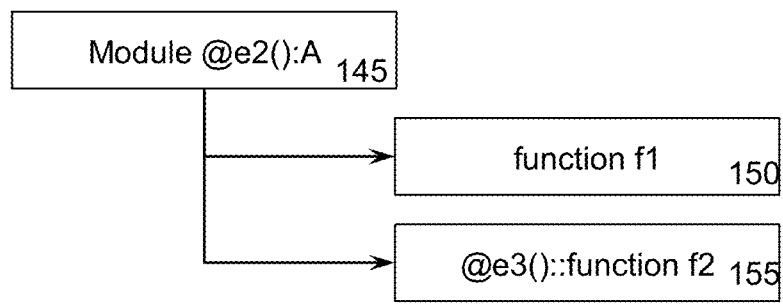
FIG. 1C depicts another representation of a module in accordance with an embodiment of the present invention

Thus, FIG. 1C depicts module e2( )::A 145 in which functions f1 250 and e3( )::f2 155 are defined. If condition e2( ) is true and e3( ) is not true, the composition of A and e2( )::A will include functions e2( )::A.f1, A.f2, A.f3. However, if both e2( ) and e3( ) are true, the composition of A and e2( )::A will include functions e2( )::A.f1, e2( )::A.f2, A.f3. Thus, module e2( )::A completely replaces function f1 and function f2 if e3 is true. Function f3 remains the same. Such a composition enables a software developer to replace existing functionalities with functionalities that are customized to specific contexts.

Modules support the ability to define function, modules and classes inside them. This enables building of module, function and class hierarchies. The hierarchies capture the structure of the software as well as the natural abstraction inherent in an application. In some embodiments described herein, conditional composition enables extensions and modifications to both.

Figure 2A:
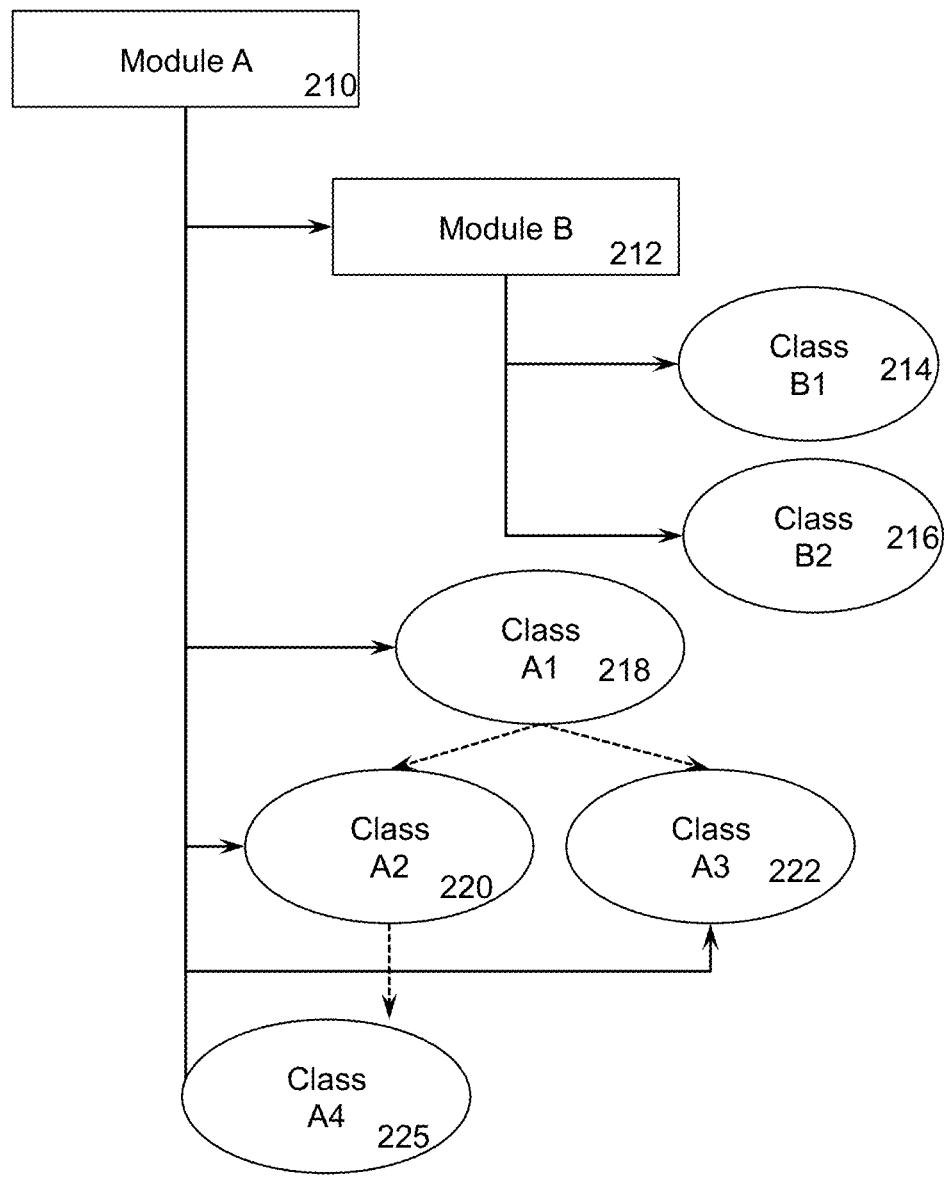
FIG. 2A depicts another representation of a module in accordance with an embodiment of the present invention

FIG. 2A shows a module that defines nested modules as well as class hierarchies. Module A 210 defines classes A1 218, A2 222, A3 222, and A4 225. The dotted lines depict the class hierarchy (for instance, class A2 is a subclass of A1). It also contains modules B 212, which defines classes B1 214 and B2 216.

Figure 2B:
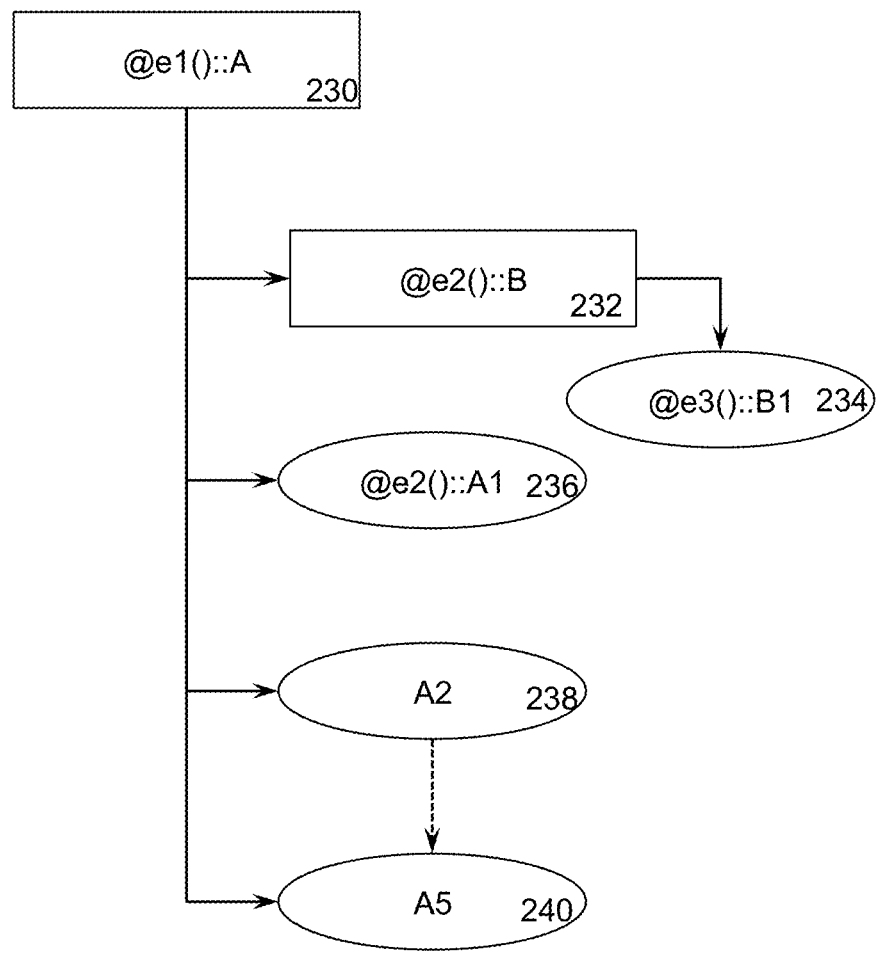
FIG. 2B depicts a representation of a module and class hierarchy in accordance with an embodiment of the present invention

FIG. 2B depicts a conditional extension of the module and class hierarchy. Module A is extended by defining new classes, and by modifying existing modules and classes. For instance, e1::A 230 adds a new class A5 245, modifies classes A1 236 and A2 238, and modifies class B1 234. In embodiments described herein, conditional abstractions follow the structure and hierarchy of the original module, and extend it orthogonally. This makes it easier to develop applications that first target a specific platform or specific condition. This may be extended to other platforms by creating conditional abstractions with identical structure and hierarchy.

Figure 2C:
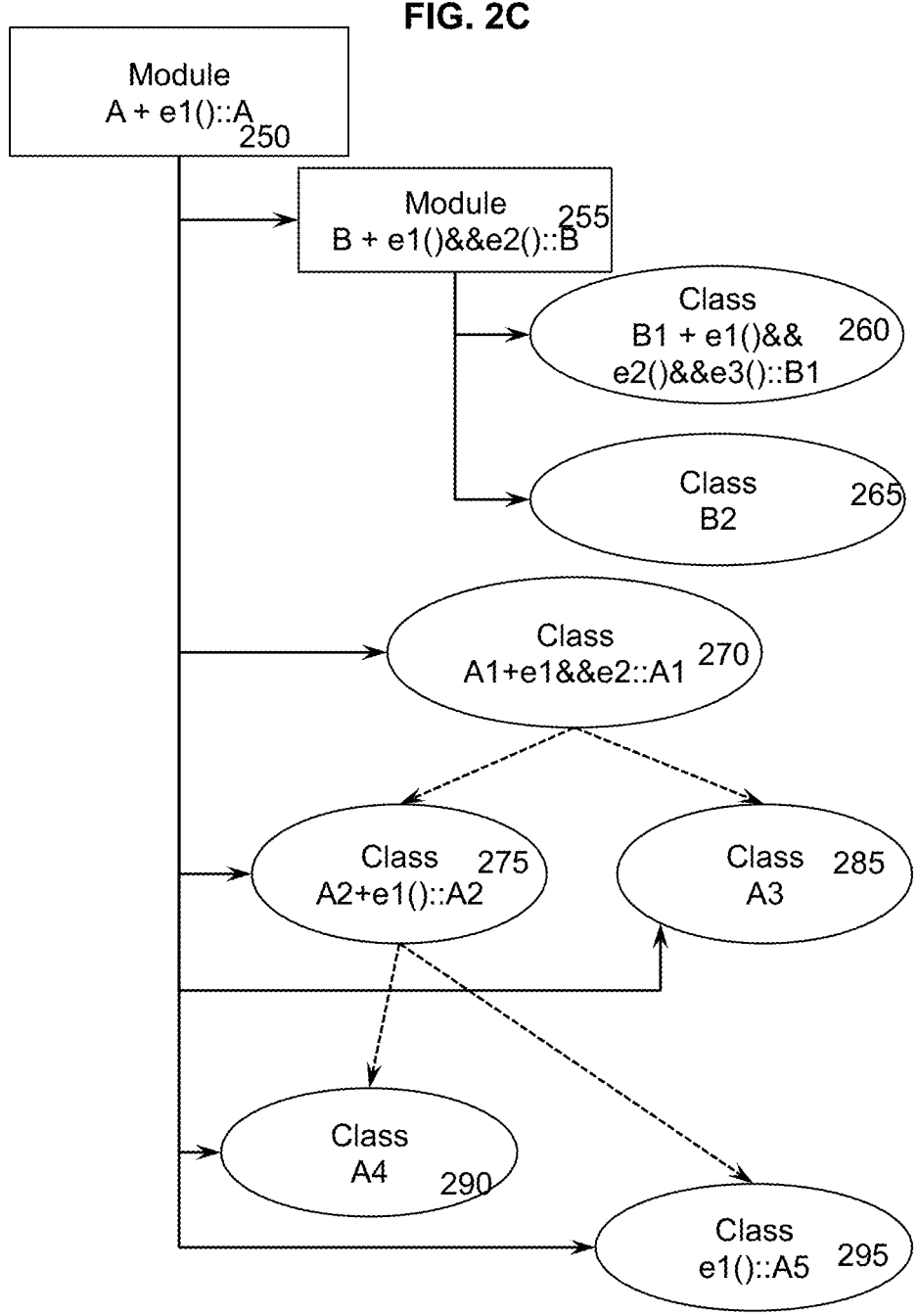
FIG. 2C depicts a representation of a composition in accordance with an embodiment of the present invention

FIG. 2C depicts a composition of A+e1( )::A 250 of A and e1( )::A. Module B+e1( ) && e2( )::B 255 is a composition of nested modules B and e2( )::B of A and e1( )::A. The composition takes place only if the Booleans expressions e1( ) and e2( ) are true. Class B1+e1( ) && e2( ) && e3( )::B1 260 is a composition of class B1 and e3( )::B1( ). The two classes are composed only if the Boolean expressions e1( ) e20, and e3( ) are true. Class B2 265 remains unchanged. Class A1+e1( )&&e2( )::A1 270 is a composition of the classes A1 and e1( ) && e2( )::A1. Class A2+e1( )::A2 275 is a composition of class A2 and e1( )::A2. Unconditional classes A3 275 and A4 280 are a part of the unconditional module A and remain unchanged. Class e1( )::A5 is a part of conditional module e1( ):A, and is included if e1( ) is true. The system uses the composition rules described above to recursively merge different conditional and unconditional modules, classes and functions.

Building Software from Unconditional and Conditional Abstractions

Embodiments described herein have been implemented on a new full programming language called Ankur that provides support for conditional abstractions as described above. Ankur is an object-oriented programming language that supports abstractions for modules, classes, functions, objects, threads, etc. It also allows for definition of conditional abstractions. Ankur is designed to support "build for one, extend to any" methodology. Conditional abstractions allow one to capture both common and differentiated code within the same framework. These abstractions enable one to create software abstractions for a specific context and then easily extend to other contexts by adding conditional components.

In embodiments described herein, adapting an existing code base to a new context is performed by defining context-specific or conditional abstractions. The following provides a "build for one, extend to many" methodology that enables application developers to adapt existing code base to new context:

- Define a module that will captures the common components
- Define class hierarchies (classes/subclasses) within the module
- If there are abstractions (such as modules, functions or classes) that are specific to a context or that introduce variability, separate them out as conditional abstractions.
- Build applications using the modules and class hierarchy for a given context, differentiated context, platform, etc.
- As new contexts arise, figure out the modules, functions, classes that need to be redefined or extended for the new context. Instead of modifying the original code, create additional conditional function, classes and modules with the suitable conditions.
- Define conditional expressions that map to specific contexts. The system automatically composes the various unconditional and conditional abstractions to build an application that is specific to the context as defined by the conditional expressions.

Program examples described below refer to components using the Ankur programming language with a ".ank" extension. Embodiments described herein receive specifications of conditional and unconditional software abstractions and generate a binary that can execute on a platform.

Figure 3:
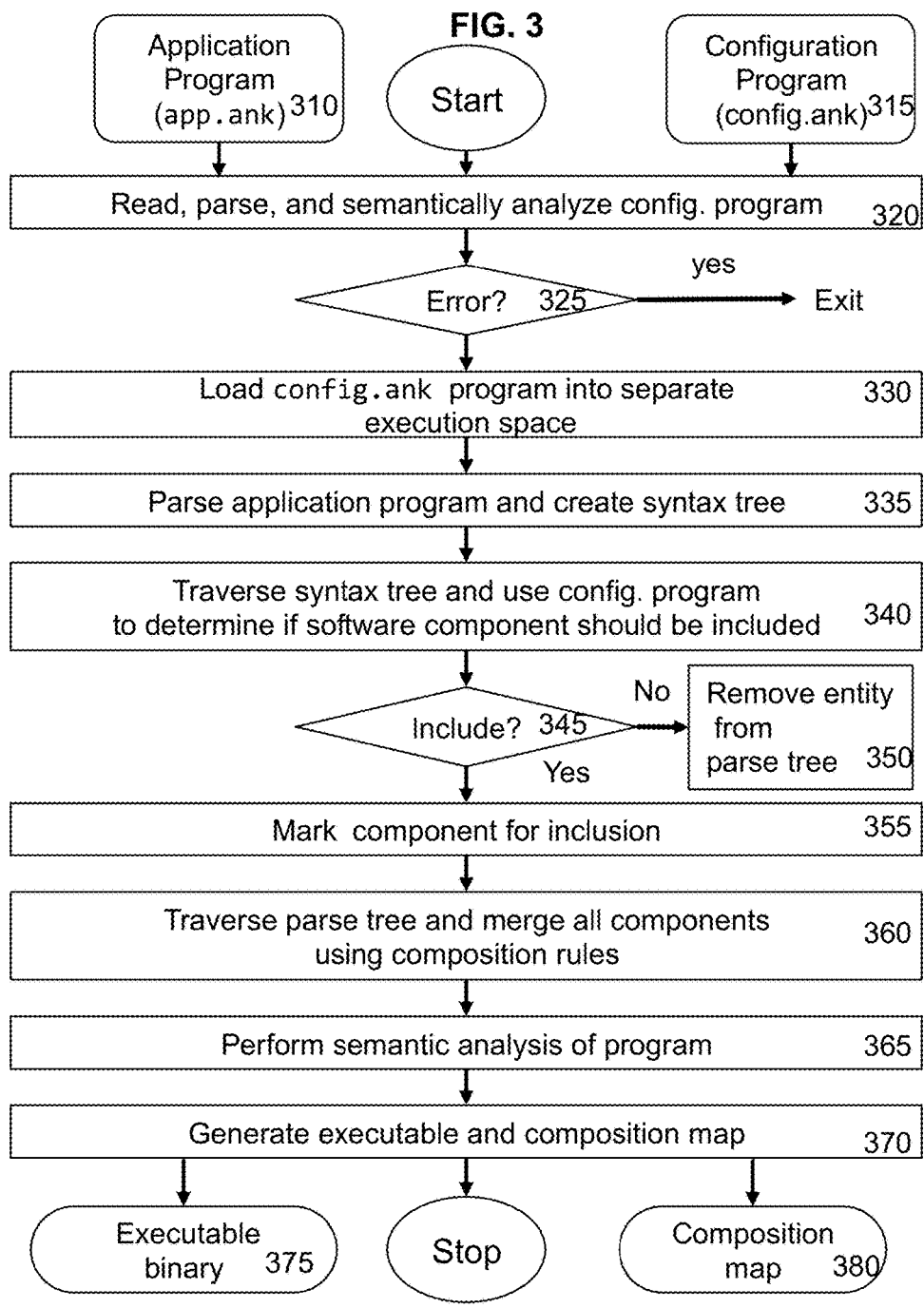
FIG. 3 depicts a flowchart for building an executable binary for an application with conditional and unconditional components in accordance with an embodiment of the present invention

FIG. 3 presents a flowchart illustrating a method for building binaries for applications that contain both conditional and unconditional components. The steps of FIG. 3 constitute merely one of many methods that may be performed to build the binaries. Other methods may include more or fewer steps in other orders than depicted in FIG. 3.

In Step 320, the system receives two sets of Ankur programs: a configuration program, config.ank 315, and an application program, app.ank 310. The config.ank is just like an application program, written in the same high level language (Ankur, instance) as any application program. It can use any of the abstractions and libraries of the programming language. It has the full power of a high level programming language. The configuration program contains the logic for defining, and computing the different Boolean expressions that are associated with the conditional abstractions. During composition, the system compiler will evaluate all conditions against the logic specified in the program specified by config.ank.

The app.ank program is the main program which contains both conditional and unconditional components, and whose binary will be created. Each conditional component in the software application 110 specifies a situation- or context-specific behavior.

Step 320 involves checking for the validity of the configuration program. Upon determining in step 325 that there is no error, step 330 involves create an executable for config.ank. The executable will contain all the source code associated with config.ank, and any libraries. The system then loads the executable into memory. This will create all data structures required to execute functions, define variables, etc. in config.ank. The system creates an execution context from a separate stack and heap for the config.ank executable. This is needed for evaluating the Boolean expressions associated with the conditional abstractions. Any expressions that use abstractions of config.ank are evaluated within this execution context independently Step 335 involves analyzing the input program for syntax and semantic errors. In step 340, each variable component is analyzed within the scope of the configuration program to determine if the particular variable component needs to be composed with the common components. If it is determined in step 340 that a particular variable component does need to be composed with the common elements, the common and variable components are semantically combined in steps 355 and 360 for inclusion as a part of the composed program. The rules for composition are described earlier in this document. If it is determined in step 340 that the particular variable component does not need to be composed with the unconditional components, in step 350, the variable component is discarded. The resulting composed program is a set of components that include both conditional and unconditional components. Step 365 involves analyzing the semantics of the merged program. If any semantic errors are found, these errors are flagged and the compilation is terminated. In step 370, an executable binary 375 and a composition map 380 are generated for the application. The composition map 380 contains a list of all unconditional and conditional entities, as well as the conditions under which specific conditional entities were included. The compositional map will also include a copy of config.ank.

Testing of Software Application for Multiple Contexts, Situations, or Platforms

Testing a software system involves measuring the runtime behavior of the system and its components against a set of expected behavior. The measurements may span individual statements and expressions, blocks of statements, functions, objects, modules, subsystems and system as a whole. Embodiments described herein involve methods for testing software systems that may behave differently in different context or situations, and/or different platforms.

In Situ Testing and Debugging

A technique for testing and debugging often involves adding testing code, debugging statements or assertions that check for an application's behavior as it is running. For instance, in the code shown below, the testing code has been inserted within the body of the main code to check for specific values of variables at different points in execution:

```
{
    var x, y:Integer;
```

```
    ...
    { // test code
        if (x != f(y)) { flagError( ); }
    }
    ...
    {// test code
        if (x != g(y)) { flagError( );}
    }
}
```

After testing, most of this code is either commented out or manually removed so that they are not a part of the production code. This means that the tester must manually manage insertion, deletion or commenting of the testing code. If there are problems with the above code in future, the tester must insert new sets of testing code again, build the application and run them.

Some embodiments described herein involve managing testing code through the conditional abstraction mechanism. In this approach, the testing code is tagged with specific conditions as shown below:

```
{
    var x, y: Integer;
    ... // production code
    @Test1( )::{ // test code
        if (x != f(y)) { flagError( ); }
    }
    ... // production code
    @Test2( )::{// test code
        if (x != g(y)) { flagError( );}
    }
}
```

During the testing process, both conditions Test1( ) and Test2( ) will be set to true. The Ankur compiler selects and includes the test codes, which are executed at runtime. For production runs, the two conditions may be set to be false, in essence removing the entire conditional code. This enables the development operations and testing personnel to collaborate together in developing a single build and testing process.

Embodiments presented herein describe a method for testing an application. Assume that there are n different types of situation in which context-specific condition must be run. The developer and tester first define a configuration file config.ank that defines n Boolean variables. The developer and tester then define code that is specific for each situation. They then take the application program, say, app.ank, and insert into the body of the different components of the application. They surround each code with the conditional variable specific to that situation. For instance, for situation i, variable v_i and code code_i, the insert the following code:

```
@v_i::{ // test code
    code_i
}
```

The above specifies that code_i is only executed or included as part of the application if Boolean expression v_i is true. This will take an application program, say app.ank, and produce a new program, app+test.ank. Here the symbol '+' denotes a program that contains components from both the application program (app.ank) and test program (test.ank).

For production mode, the developers and testers set up config.ank that initializes each Boolean variable to false. This will ensure that none of the situation-specific code is included as part of the actual application. For running situation i, developers change config.ank so that variable v_i is true, thereby running the context-specific code.

Figure 4:
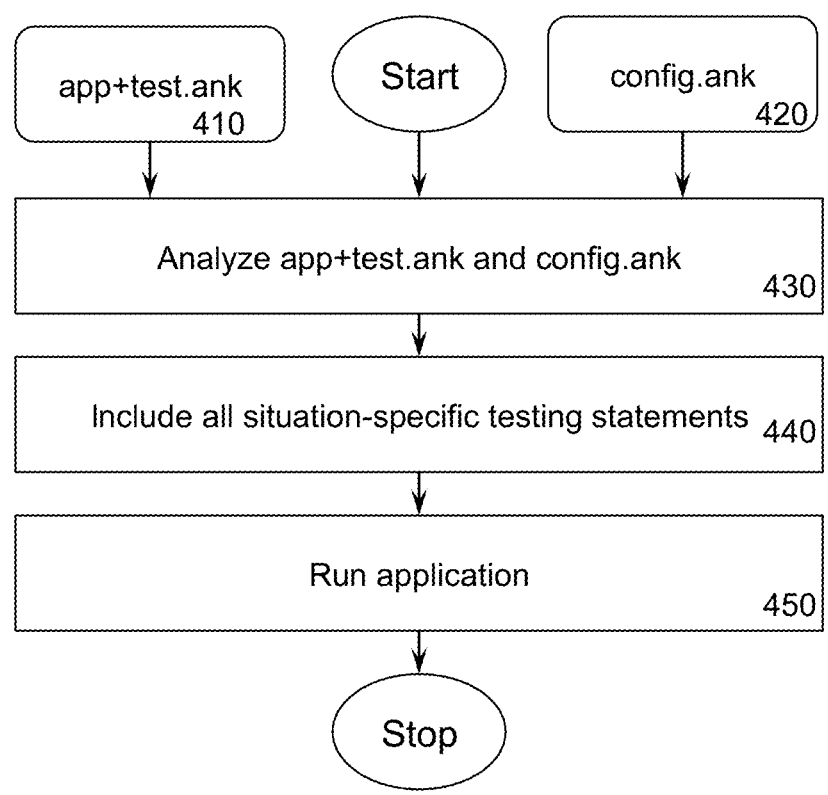
FIG. 4 depicts a flowchart for managing testing code within the body of an application in accordance with an embodiment of the present invention

FIG. 4 depicts a flowchart for managing testing code within the body of an application. The steps of FIG. 4 constitute merely one of many methods that may be performed to build the binaries. Other methods may include more or fewer steps in other orders than depicted in FIG. 4.

The system takes as input an application program, app.ank+test.ank 410, and config.ank 420. In Step 430, the system will analyze the two programs. The system will include all situation code that will need to be a part of this test run in step 440. Finally, in step 450, it will generate binaries and run application.

Multi-Context Testing

Testing an application for multiple situations/context requires tailoring test programs for testing both context-independent and context-specific components of the application. This often involves manually writing test programs for each context and then testing them separately. This results in duplications of testing efforts, inconsistencies, and incompleteness, which has impact on the application quality.

Embodiments described herein facilitate the development of test programs for multiple platforms. The approach involves the following: Assume that an application is defined in terms of module, classes, and function components. Further, assume that application will be targeted to two contexts: C1 and C2. Note that while two contexts are chosen for ease of description, the embodiments described herein is not limited to a specific number of contexts, and may be extended to more than two contexts. For each program component, A, the first step is to factor out abstractions and behavior (state, functions, etc.) that are common across both C1 and C2. The developer implements the common abstraction as unconditional abstraction A. This abstraction may be modules, classes, functions, or anything supported by the underlying language. The next step is to implement C1 context-specific abstractions of A into C1( )::A component. C1( ) is a Boolean expression that is true when the context is C1. Next, implement C2 context-specific abstractions of A into C2( )::A component. C2( ) is a Boolean expression that is true when the context is C2. Composition of A and C1( )::A defines application for context C1. Similarly composition of A and C1( )::A defines application for context C2. This is repeated for all components in the application.

The next step involves writing test programs that test common and context-specific abstractions. For every abstraction A, define a conditional abstraction Test( )::A that contains test programs for testing the behavior of A component. Test( ) is a Boolean expression that is true whenever we want to test components. Test( ) sets the context as that of testing. Next, define a conditional abstraction Test( ) && C1( )::A that contains test programs for testing the behavior of C1( )::A component. This should include only those test programs that are specific to the context represented by C1. Next, define an abstraction Test( ) && C2( )::A that contains test programs for testing the behavior of C2( )::A components. This should include only those test programs that are specific to the context represented by C2.

Figure 5:
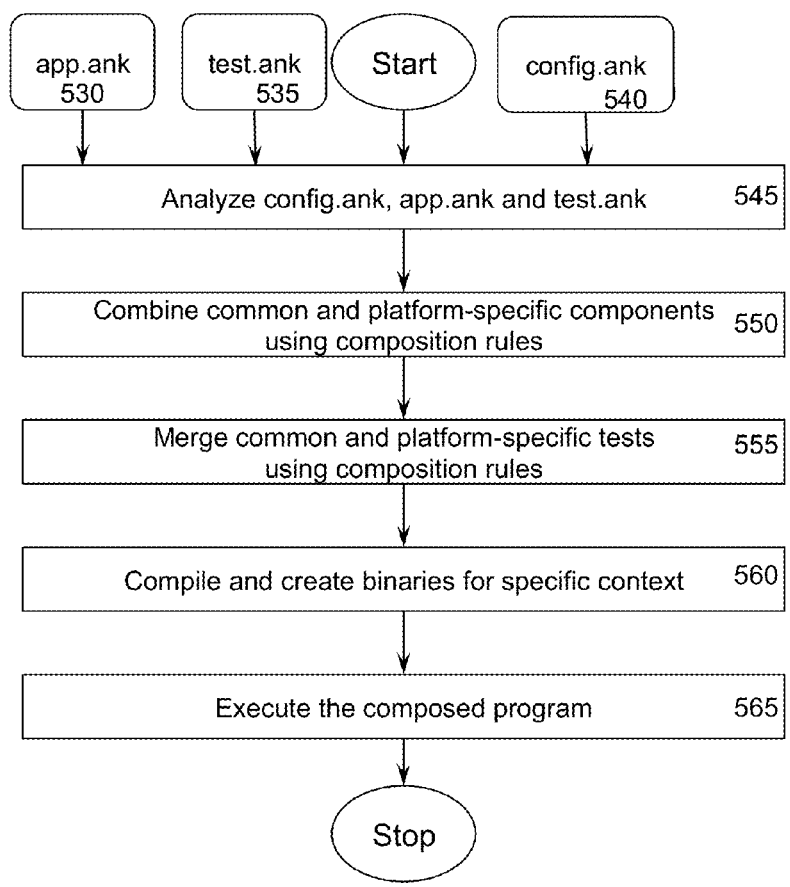
FIG. 5 depicts another flowchart for managing testing code within the body of an application in accordance with an embodiment of the present invention

FIG. 5 describes a system for testing programs with multiple contexts. The steps of FIG. 5 constitute merely one of many methods that may be performed to build the binaries. Other methods may include more or fewer steps in other orders than depicted in FIG. 5.

The multiple contexts apply for testing applications that may run on many different platforms (such as iOS™, Android™, Web™, Mac™, Linux™, Windows™, etc.). The system takes as input an application program, app.ank 530, a configuration program config.ank, and a test program, test.ank. The application program contains both conditional and conditional components that target the application for different contexts. The test program, test.ank 540, contains test program components that test the behavior of common components (for instance A) as well as context-specific components P( )&&Test( )::A. The configuration program, config.ank 535 contains the Boolean expressions that set conditions for selection of specific components and test programs. In step 545, the system analyzes the input for syntactic and semantic errors. The system then uses the composition rules to combine unconditional components and conditional components in step 550. Step 555 involves the system merging the test programs (both common and context-specific) with the application that includes context-independent components, context-specific components, context-independent test programs, and context-specific test programs. In step 565, the system compiles the merged program and creates a binary. Finally, in step 566 the system runs the program. The execution of program tests the different components for their behavior as specified the different test components.

Remotely Managing Application Infrastructure

A key component of application management involves distribution and installation of applications on a wide variety of devices. In the case of mobile applications for platforms such as iOS or Android, this typically involves submitting the applications to a specific application store associated with the platform. The application store then provides application distribution services. In the case of Internet of Thing (IoT) devices, since an application may include thousands of sensors and gateways and other end points, specially designed software tools handle the task of distributing and installing software. An application that can run on a wide range of devices will require services to distribute and install different kinds of binaries on the different devices. Further, as application change, the modified binaries need to be distributed again.

Figure 6:
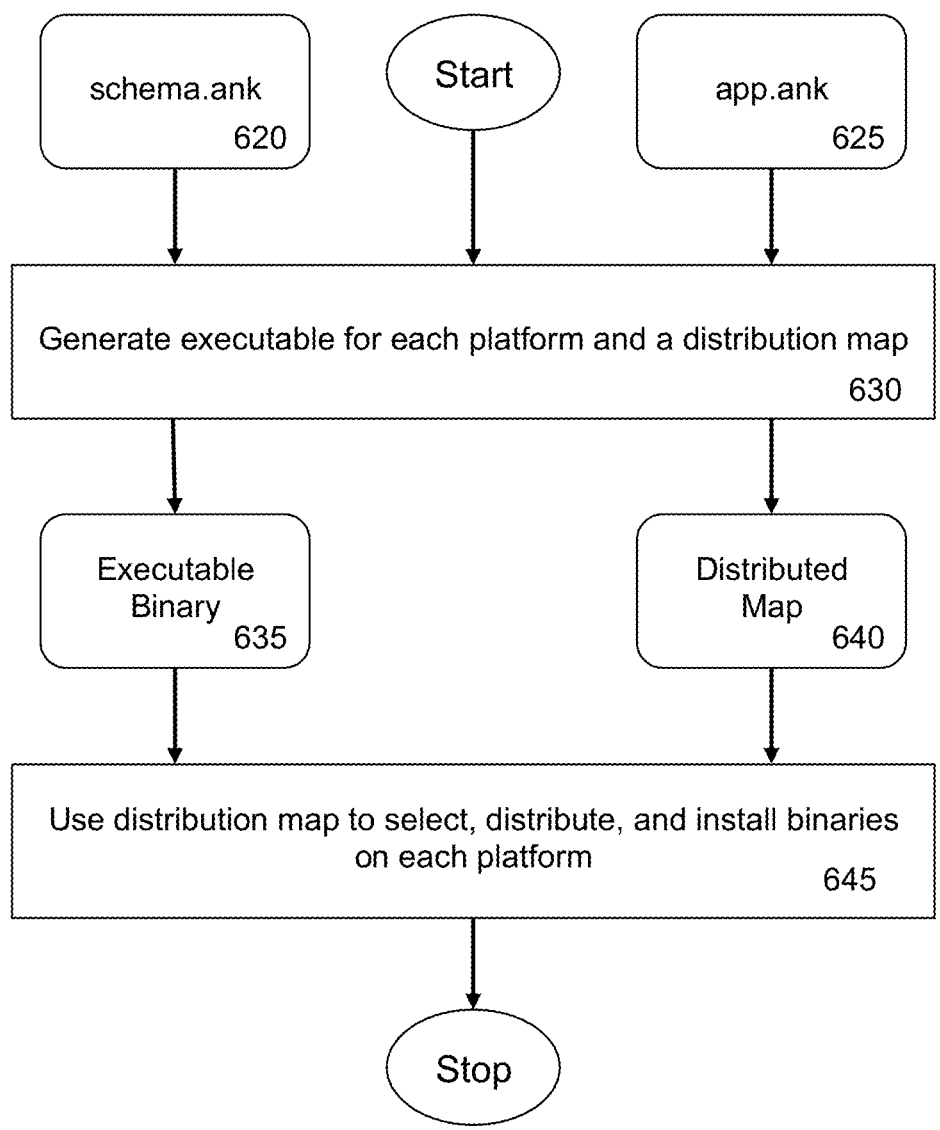
FIG. 6 depicts a flowchart for automating the process of distributing and installing platform-specific binaries in accordance with an embodiment of the present invention

FIG. 6 depicts a flowchart for automating the process of distributing and installing platform-specific binaries. The steps of FIG. 6. constitute merely one of many methods that may be performed to build the binaries. Other methods may include more or fewer steps in other orders than depicted in FIG. 6.

The system takes as input two components: app.ank 615 and schema.ank 625. app.ank contains both platform-independent and platform-specific code. schema.ank is a deployment schema that contains the following: i) Profiles for each device/platform, including IoT and mobile devices. The profiles define their hardware characteristics (CPU, memory, sensors, etc.), their system software characteristics (the OS, its version, the APIs, etc.), location of each device if location is important, security requirements, and other characteristics describing the device/platform. ii) Programs that capture the characteristics of different platforms in terms of Boolean expression, iii) a list of applications that will run on each device, and (iv) a list of security policies.

The system will use the deployment schema to determine the different platforms that need to be managed. For each deployment target type in the deployment schema, in step 630, the system will build a binary specific to that platform.

It builds a repository of the binaries, and maintains a distribution map 640. The distribution map keeps a mapping between the different platforms and the different software components that were used for building the binaries for each platform. The system then checks the security policies specified in schema.ank to ensure that installation of specific binaries on specific platforms is permitted. Finally, in step 645, the system then uses secure, reliable, and scalable protocols for automatically distributing, installing and running the applications on the platforms.

Managing Changes in Applications

Applications change in order to adapt to changes in requirements, to add new functionalities or to fix bugs. As these changes occur, the binaries that exist on different platforms may need to be updated as well. For instance, consider an IoT application that is running on thousands of devices. Assume that there is a security bug that requires that the application be fixed. As the application changes, these fixes need to be installed on all devices that are affected by this bug. n a heterogeneous environment, it will require building different binaries and distributing them to each device.

Figure 7:
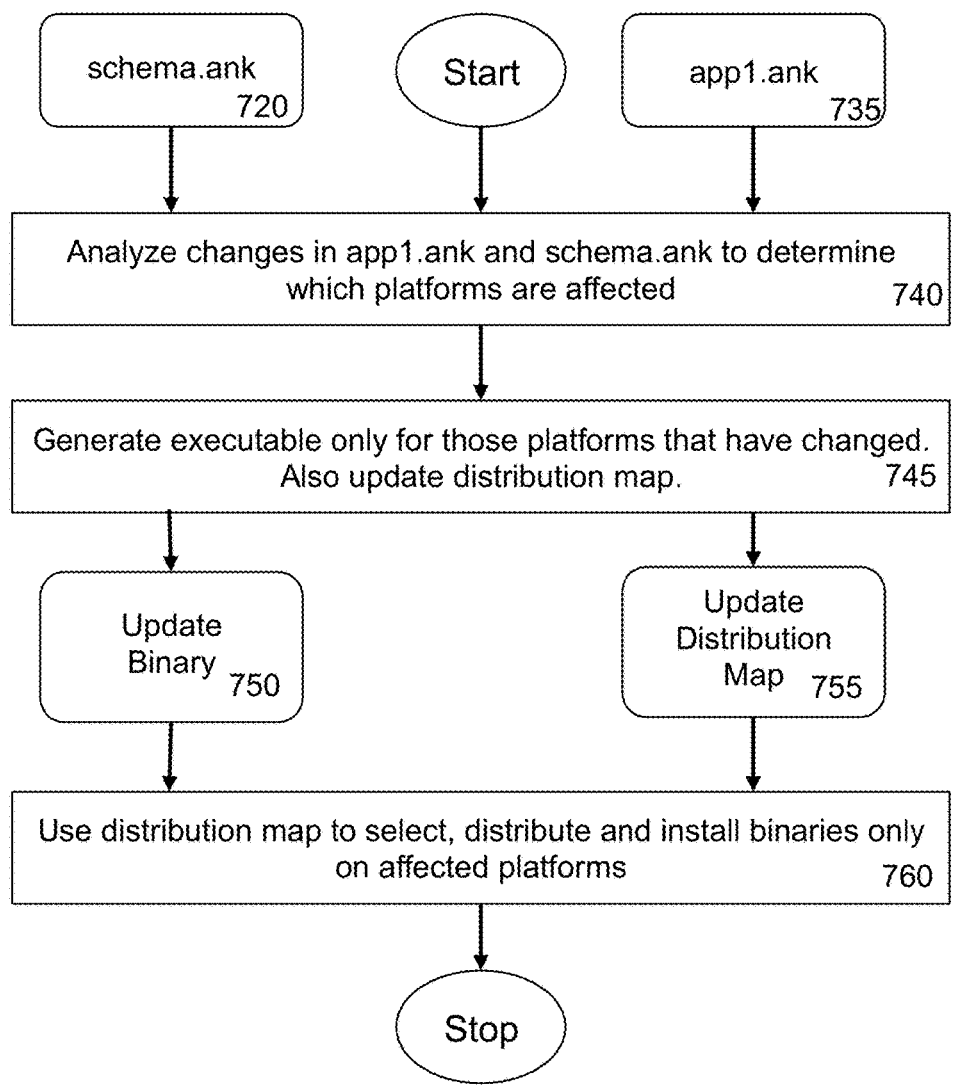
FIG. 7 depicts identifying platform-specific changes and generating correct binaries for distribution to correct devices accordance with an embodiment of the present invention

FIG. 7 describes how platform-specific changes to an application and the application components are identified, how the correct binaries are generated, and propagated only to the right devices. The steps of FIG. 7 constitute merely one of many methods that may be performed to build the binaries. Other methods may include more or fewer steps in other orders than depicted in FIG. 7.

The system takes as input Schema.ank 710 and app.ank 715. The two inputs respectively denote the deployment schema and applications described earlier in FIG. 6. Assume that changes in the application app.ank leads to a new application app1.ank 735.

In step 740, the system analyzes the app1.ank for changes with respect to app.ank. In this step, the system determines all common components that have been affected by changes. If common components have changed, all devices must be updated with the new code. The system then determines all conditional components that have changed. However, if only conditional components are affected, only the code for device/platforms for which conditional components apply must be changed. The system looks at the deployment map, which contains a mapping between the different devices and the different conditional and unconditional components. From this mapping, the system determines all the devices that need to be updated with the updated code. In step 745, the system uses the deployment schema to build binaries for only those devices that need to be updated. After building the new binaries, in step 750, the system updates the binary storage, and in step 755, the system updates the distribution map 755. In step 760, the system uses the distribution map to select those platforms/devices for which the code needs to be updated, and installs new binaries on only these devices.

Computing Environment System

Figure 8:
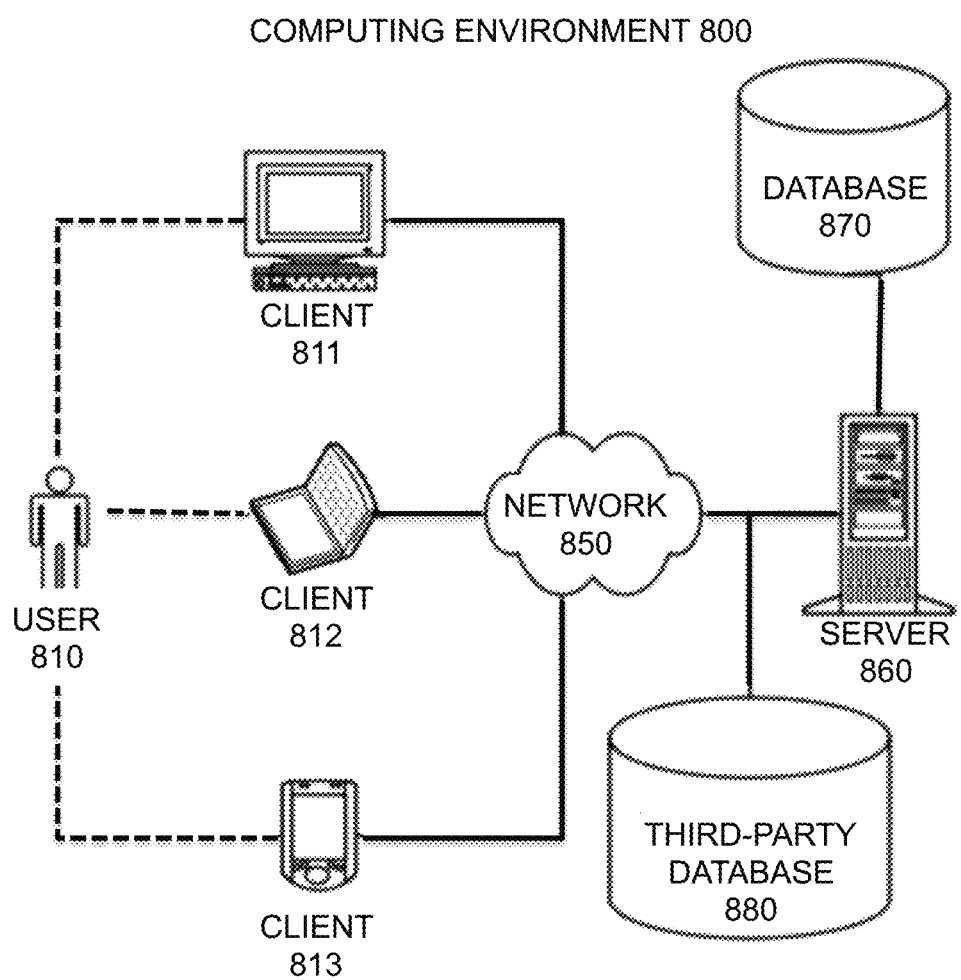
FIG. 8 presents a computing environment in accordance with an embodiment of the present invention.

FIG. 8 illustrates a network in accordance with an embodiment of the present invention. Computing environment 800 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 8, computing environment 800 includes a user 810; clients 811-813; a common network access point 840, possibly acting as a Wi-Fi hotspot and providing local wireless connectivity to clients 811-813, that connects to a network 850; a server 860; and a database 870, possibly acting as cloud data storage.

Clients 811-813 can include any node on a network including computational capability and including a mechanism for communicating across the network. Additionally, clients 811-813 may comprise a tier in an n-tier application architecture, wherein clients 811-813 perform as servers (servicing requests from lower tiers or users), and wherein clients 811-813 perform as clients (forwarding the requests to a higher tier). Furthermore, a client can include any type of electronic device, including, but not limited to, cell phones, personal digital assistants (PDAs), smartphones, tablet systems, personal music players (such as MP3 players), gaming systems, digital cameras, video cameras, portable storage media, or any other device that can be coupled to the client.

Similarly, a server 860 can generally include any node on a network including a mechanism for servicing requests from a client for computational and/or data storage resources. A server 860 can participate in an advanced computing cluster, or can act as a stand-alone server.

A user 810 can include: an individual; a group of individuals; an organization; a group of organizations; a computing system; a group of computing systems; or any other entity that can interact with computing environment 800.

Network 850 can include any type of wired or wireless communication channel capable of coupling together computing nodes. This includes, but is not limited to, a local area network, a wide area network, or a combination of networks. In one embodiment of the present invention, network 850 includes the Internet. In some embodiments of the present invention, network 850 includes phone and cellular phone networks.

Database 870 can include any type of system for storing data in non-volatile storage. This includes, but is not limited to, systems based upon magnetic, optical, or magneto-optical storage devices, as well as storage devices based on flash memory and/or battery-backed up memory. Note that database 870 can act as a cloud data storage and can be coupled: to a server (such as server 860), to a client, or directly to a network.

Note that different embodiments of the present invention may use different system configurations, and are not limited to the system configuration illustrated in computing environment 800. In general, any device that is capable of communicating via network 850 may incorporate elements of the present invention.

System

Figure 9:
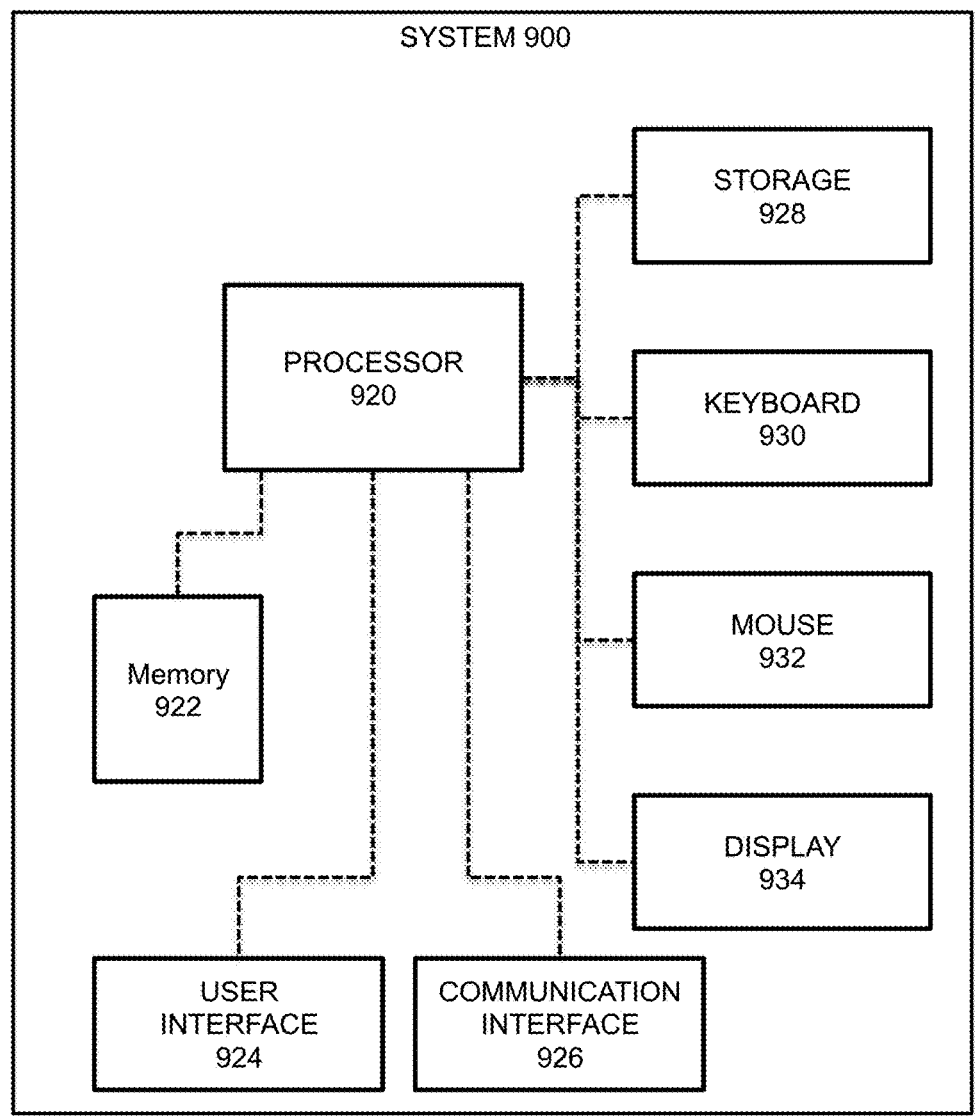
FIG. 9 illustrates a system in accordance with an embodiment of the present invention.

FIG. 9 illustrates a system 900 in accordance with an embodiment of the present invention. As illustrated in FIG. 9, system 900 can include processor 920, memory 922, user interface 924, communication interface 926, storage 928, and/or other components found in electronic computing devices. Processor 920 may support parallel processing and/or multi-threaded operation with other processors in computer system 900. Computer system 900 may also include input/output (I/O) devices such as a keyboard 930, a mouse 932 and a display 934.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for creating an executable binary of an application program, the method comprising:
   receiving a configuration program;
   checking the validity of the received configuration program;
   creating a configuration executable binary of the received configuration program;
   loading the configuration executable binary into a configuration execution space;
   receiving an application program with one or more conditional components and one or more unconditional components;
   creating a parse tree of the application program;
   analyzing the parse tree of the application program for syntax errors and semantic errors;
   traversing the parse tree of the application program by, for each component in the parse tree of the application program,
     if the component is a conditional component,
     evaluating the component in the configuration execution space for inclusion in the application program; and
     marking the component for inclusion in the application program based on the evaluation;
   modifying the parse tree of the application program based on the marked components to generate a modified parse tree of the application program;
   performing semantic analysis of the modified parse tree of the application program; and
   generating an executable binary for the application program and a composition map for the application program.

2. The method of claim 1, wherein the one or more conditional components include one or more of:
   a conditional module;
   a conditional class;
   a conditional function;
   a conditional statement; and
   a conditional variable.

3. The method of claim 1, wherein the one or more conditional components are each associated with a set of one or more component-specific conditions.

4. The method of claim 3, wherein evaluating the component in the configuration execution space for inclusion in the application program further comprises evaluating one or more component-specific conditions of the component in the configuration execution space.

5. The method of claim 4, wherein evaluating the one or more component-specific conditions of the component in the configuration execution space further comprises determining if the one or more component-specific conditions evaluate to true or to false in the configuration execution space.

6. The method of claim 5, wherein marking the component for inclusion in the application program based on the evaluation further comprises:
   determining, based on the evaluation, that the component should be included in the application program; and
   marking the component for inclusion in the parse tree of the application program.

7. The method of claim 6, wherein marking the component for inclusion in the application program based on the evaluation further comprises:
   determining, based on the evaluation, that the component should not be included in the application program; and
   removing the component from the parse tree of the application program.

8. The method of claim 1, wherein modifying the parse tree of the application program based on the marked components further comprises merging one or more marked components in the parse tree of the application program.

9. The method of claim 8, wherein merging the one or more marked components in the parse tree of the application program is based on composition rules.

10. The method of claim 9, wherein the composition rules are defined specifically for at least each of:
    a conditional module;
    a conditional class;
    a conditional function;
    a conditional statement; and
    a conditional variable.

11. A non-transitory computer-readable storage medium storing instructions that, when executed by a computer, cause the computer to perform a method for creating an executable binary of an application program, the method comprising:
    receiving a configuration program;
    checking the validity of the received configuration program;
    creating a configuration executable binary of the received configuration program;
    loading the configuration executable binary into a configuration execution space;
    receiving an application program with one or more conditional components and one or more unconditional components;
    creating a parse tree of the application program;
    analyzing the parse tree of the application program for syntax errors and semantic errors;
    traversing the parse tree of the application program by, for each component in the parse tree of the application program,
      if the component is a conditional component,
      evaluating the component in the configuration execution space for inclusion in the application program; and
      marking the component for inclusion in the application program based on the evaluation;
    modifying the parse tree of the application program based on the marked components to generate a modified parse tree of the application program;
    performing semantic analysis of the modified parse tree of the application program; and
    generating an executable binary for the application program and a composition map for the application program.

12. The non-transitory computer-readable storage medium of claim 11, wherein the one or more conditional components include one or more of:
    a conditional module;
    a conditional class;
    a conditional function;
    a conditional statement; and
    a conditional variable.

13. The non-transitory computer-readable storage medium of claim 11, wherein the one or more conditional components are each associated with a set of one or more component-specific conditions.

14. The non-transitory computer-readable storage medium of claim 13, wherein evaluating the component in the configuration execution space for inclusion in the application program further comprises evaluating one or more component-specific conditions of the component in the configuration execution space.

15. The non-transitory computer-readable storage medium of claim 14, wherein evaluating the one or more component-specific conditions of the component in the configuration execution space further comprises determining if the one or more component-specific conditions evaluate to true or to false in the configuration execution space.

16. The non-transitory computer-readable storage medium of claim 15, wherein marking the component for inclusion in the application program based on the evaluation further comprises:
  in response to determining, based on the evaluation, that the component should be included in the application program, marking the component for inclusion in the parse tree of the application program; and
  in response to determining, based on the evaluation, that the component should not be included in the application program, removing the component from the parse tree of the application program.

17. The non-transitory computer-readable storage medium of claim 11, wherein modifying the parse tree of the application program based on the marked components further comprises merging one or more marked components in the parse tree of the application program.

18. The non-transitory computer-readable storage medium of claim 17, wherein merging the one or more marked components in the parse tree of the application program is based on composition rules.

19. The non-transitory computer-readable storage medium of claim 18, wherein the composition rules are defined specifically for at least each of:
  a conditional module;
  a conditional class;
  a conditional function;
  a conditional statement; and
  a conditional variable.

20. A system for creating an executable binary of an application program, comprising:
  a processor;
  a memory; and
  a non-transitory computer-readable storage medium storing instructions that, when executed, cause the system to:
  receive a configuration program;
  check the validity of the received configuration program;
  create a configuration executable binary of the received configuration program;
  load the configuration executable binary into a configuration execution space;
  receive an application program with one or more conditional components and one or more unconditional components;
  create a parse tree of the application program;
  analyze the parse tree of the application program for syntax errors and semantic errors;
  traverse the parse tree of the application program by, for each component in the parse tree of the application program,
    if the component is a conditional component,
    evaluate the component in the configuration execution space for inclusion in the application program; and
    mark the component for inclusion in the application program based on the evaluation;
  modify the parse tree of the application program based on the marked components to generate a modified parse tree of the application program;
  perform semantic analysis of the modified parse tree of the application program; and
  generate an executable binary for the application program and a composition map for the application program.

* * * * *